United States Patent [19]

Anderson

[11] 4,219,886
[45] Aug. 26, 1980

[54] MULTI-POINT REFLECTIVE TARGET SYSTEM

[75] Inventor: William B. Anderson, Silverdale, Wash.

[73] Assignee: The United States of America as represented by the Secretary of the Navy, Washington, D.C.

[21] Appl. No.: 951,698

[22] Filed: Oct. 16, 1978

[51] Int. Cl.² ............................ B06B 3/04; G01S 9/66
[52] U.S. Cl. ........................................ 367/87; 367/1; 367/13; 367/106; 181/175
[58] Field of Search .................... 340/3 T, 5 D, 8 FT; 181/0.5, 175; 367/1, 13, 87, 106

[56] References Cited
U.S. PATENT DOCUMENTS

| 3,409,868 | 11/1968 | Salathiel | 367/106 X |
| 3,771,115 | 11/1973 | McLinden, Jr. | 367/1 X |

Primary Examiner—Richard A. Farley
Attorney, Agent, or Firm—R. S. Sciascia; Charles D. B. Curry

[57] ABSTRACT

A multipoint reflective target system for use as sonar targets. The system includes a plurality of small spaced apart reflectors that are interconnected by an elongated flexible tether. The tethered reflectors are then towed in the ocean and form an elongated multipoint reflective target comprising a string of spaced apart reflectors moving under and about parallel to the ocean surface. This target is sonified by a sonar pulse and generates a reflected signal having a predetermined shape. The shape of the reflected signal is determined by a selection of parameters such as the length of sonar pulse, the spacing of the reflectors and the size and material of the reflectors. By properly selecting these parameters it is possible for the multipoint reflective target system to resemble much larger actual or similated targets.

6 Claims, 10 Drawing Figures

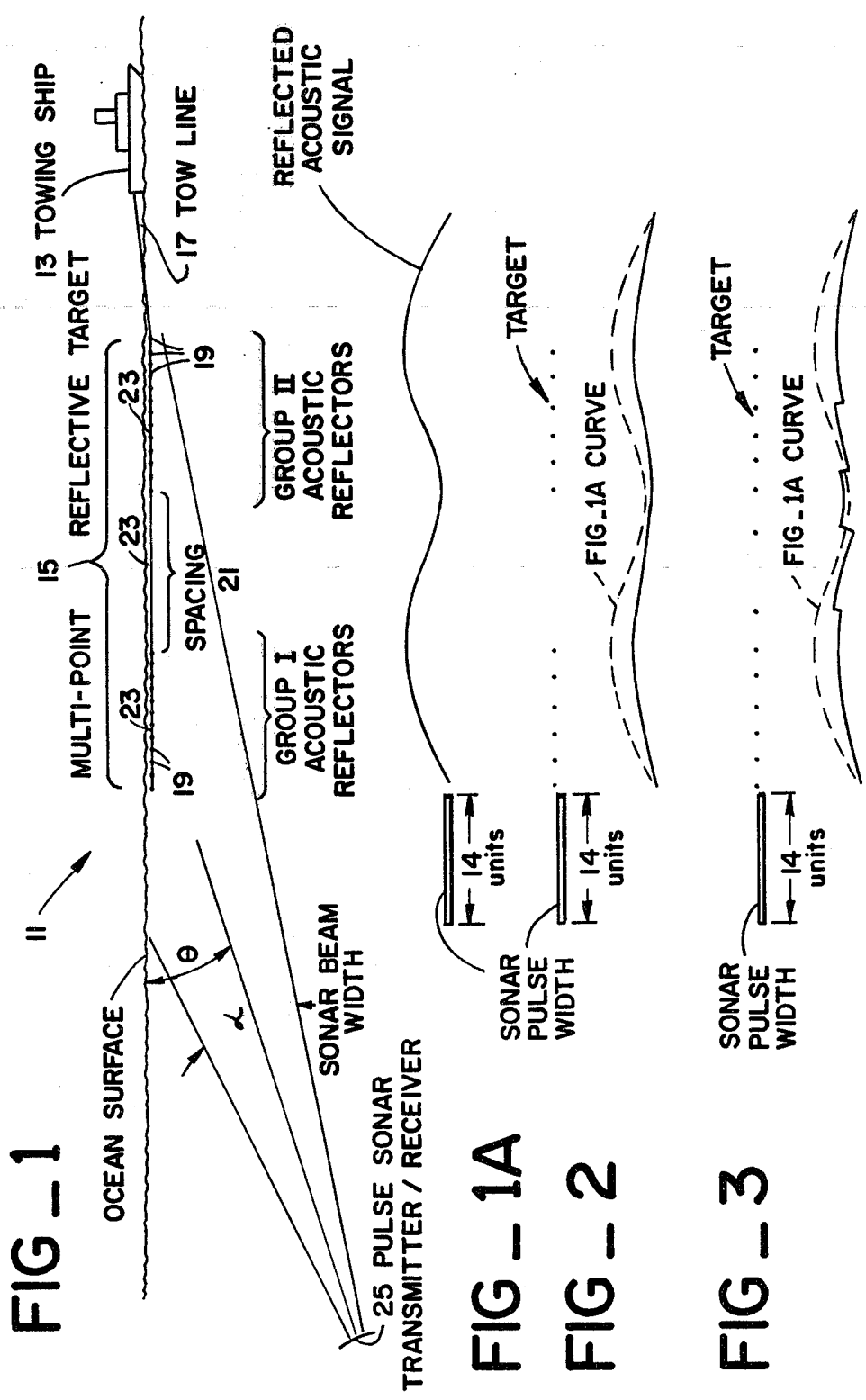

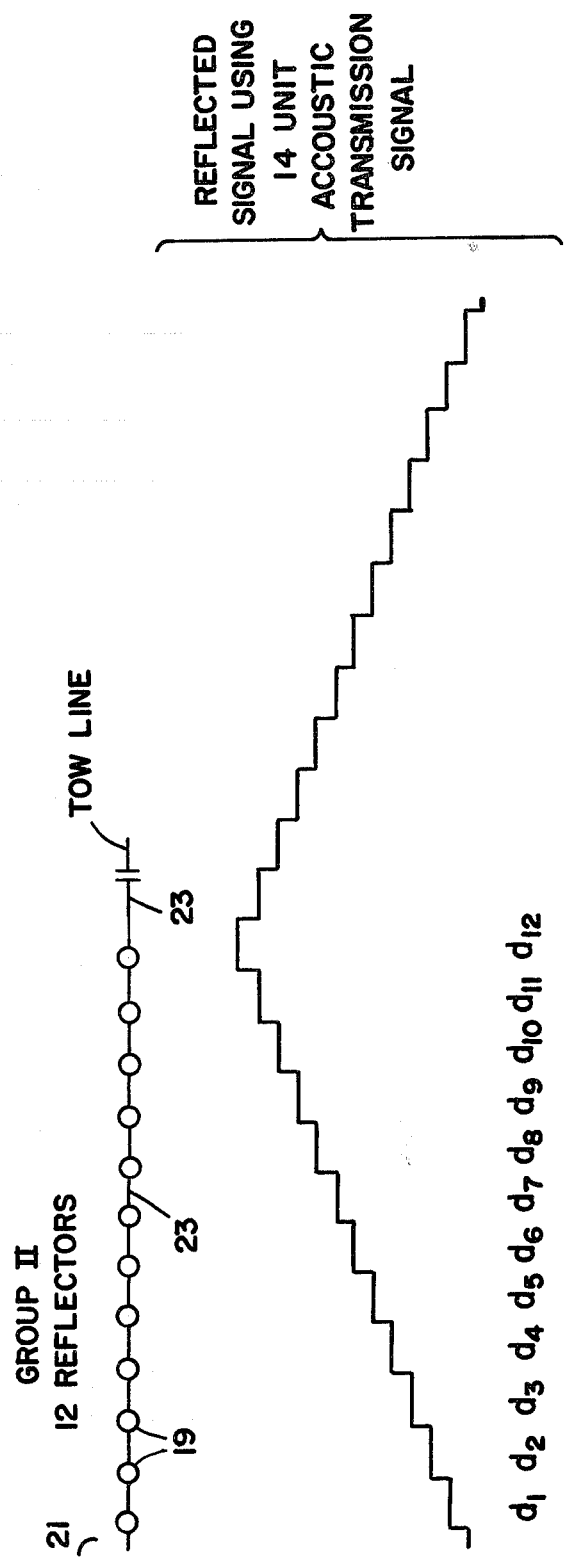

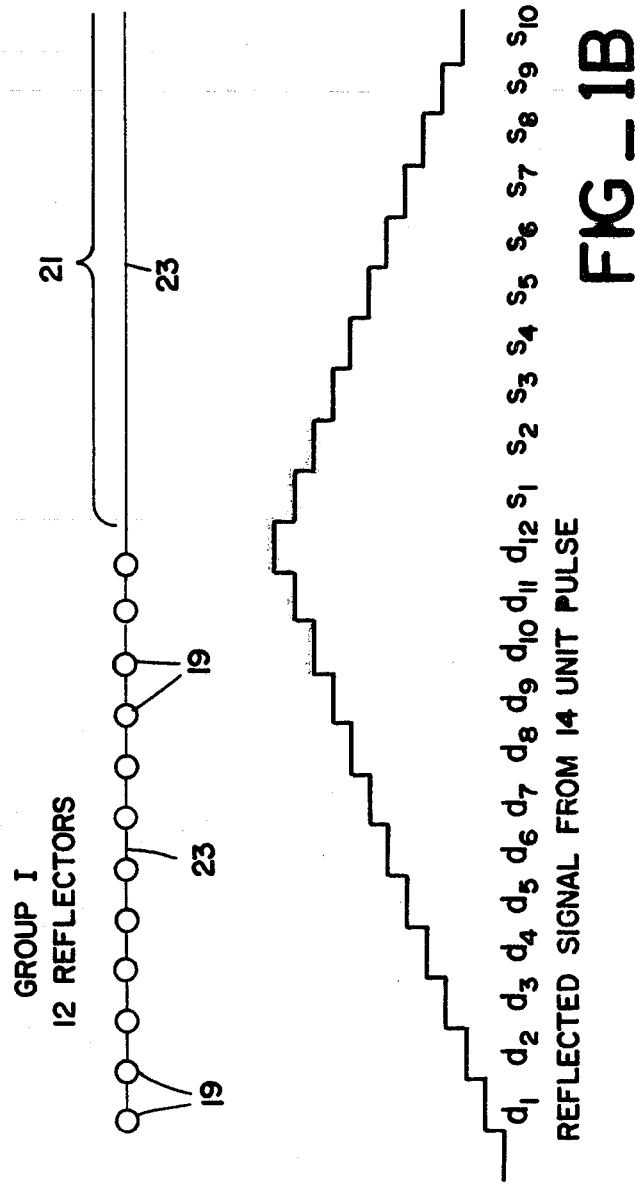

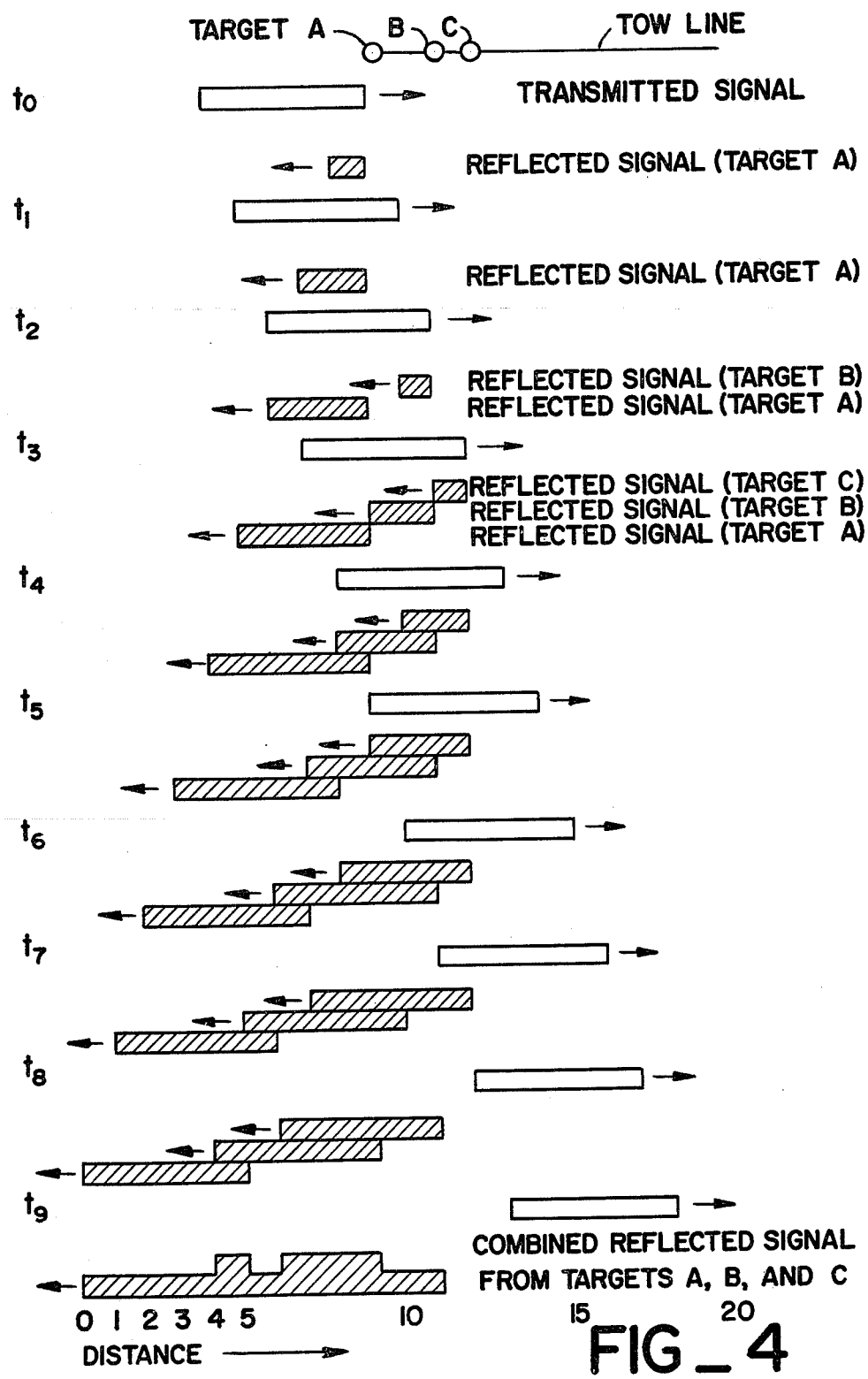
FIG_4

MULTI-POINT REFLECTIVE TARGET SYSTEM

BACKGROUND OF THE INVENTION

1. Field of the Invention

The present invention relates to a reflective target system and more particularly to a sonar multi-point reflective target system.

2. Description of Prior Art.

It is frequently necessary to test underwater sonar systems using a reflective target. In the past, the needed target strength and shape of the test target was established and then a single target was designed using emperical cut and try methods. This often resulted in large and unwieldy targets which were both difficult and dangerous to deploy. In accordance with the present invention this problem has been overcome by providing a plurality of small easily deployed reflective targets that are arranged and summed in such a manner to result in an equivalent target strength and shape.

SUMMARY OF THE INVENTION

Briefly, the present invention comprises a multipoint reflective target system for use as sonar targets. The system includes a plurality of small spaced apart reflectors that are interconnected by an elongated flexible tether. The tethered reflecters are then towed in the ocean and form an elongated multipoint reflective target comprising a string of spaced apart reflectors moving under and about parallel to the ocean surface. This target is sonified by a sonar pulse and generates a reflected signal having a predetermined shape. The shape of the reflected signal is determined by a selection of parameters such as the length of sonar pulse, the spacing of the reflectors and the size and material of the reflectors. By properly selecting these parameters it is possible for the multipoint reflective target system to resemble much larger actual or simulated targets.

STATEMENT OF THE OBJECTS OF THE INVENTION

One object of the present invention is to provide an effective reflective target.

Another object of the present invention is to provide an under water multipoint sonar.

Still another object of the present invention is to provide a small, inexpensive and easy to deploy underwater sonar target system.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a schematic drawing of one embodiment of the multipoint target system of the present invention;

FIG. 1A is a diagram showing the sonar pulse and the reflected signal of the system of FIG. 1;

FIG. 1B shows the multipoint reflective target of FIG. 1 and generally demonstrates the summation process used for generating the reflected signal.

FIG. 1C is a diagram showing the arrangement of FIG. 1B and FIG. 1B (con't.) shown on separate sheets of the drawings.

FIG. 2 shows another embodiment of the multipoint reflective target of the present invention.

FIG. 3 show still another embodiment of the multipoint reflective target of the present invention.

FIG. 4 shows a multipoint reflective target using three reflectors and specifically demonstrates the summation process used for generating the reflected signal; and FIGS. 5A, 5B and 5C illustrate different reflector shapes that may be used in the multipoint reflective target of the present invention as shown in FIGS. 1, 2 and 3.

DESCRIPTION OF THE PREFERRED EMBODIMENT

In FIG. 1 is schematically illustrated the multipoint reflective target system 11 of the present invention. As illustrated a tow ship 13 is towing a multipoint reflective target 15 by means of a tow line 17. The multipoint reflective target 15 in this embodiment is shown as including a plurality of acoustic reflectors 19 that are divided into two groups. Group I consists of twelve reflectors and group II consisting of twelve reflectors and the two groups are separated by a spacing 21. The reflectors 19 are interconnected by an elongated tether 23 made of a flexible material and preferably of a material having low acoustic cross section so as not to be a factor in shaping the reflected acoustic signal. When the multipoint reflective target 15 is towed it becomes a submerged linear extension behind the ship as illustrated in FIG. 1. This towed target is then sonified by the transmitted pulse from a pulse sonar transmitter/receiver 25. The reflected signal from the multipoint reflective target 15 is then received by the receiver after the termination of the transmitted pulse. In FIGS. 1A and 1B are illustrated the transmitted and reflected signals. It should be noted that the time duration of the transmitted sonar pulse is selected to cooperate with the characteristics of the multipoint reflective target 15 and the transmission distances to provide a reflected signal that has the appearance of a predetermined large target. For example, a certain type of submarine or surface ship may yield a reflected signal similar to that shown in FIGS. 1A and 1B and, in accordance with the present invention, the multipoint reflective target will, by its reflected signal of FIGS. 1A and 1B, acoustically appear as this certain type of vessel. In FIGS. 2 and 3 are illustrated, by the solid lines, other shapes of reflected signals that acoustically represent different targets. This is achieved by changing the number, position, size or material of the reflectors. The multipoint reflective target system of the present invention makes it possible to replace actual or similated large targets with an inexpensive and effective system.

More specifically this is achieved by a system defined by the relationship:

length = $\cos \theta tC/2$ where $\theta$—is the relative angle of FIG. 1
t—time in seconds
C—speed of sound in water - feet/second From this relationship both the transmission distance and the hereinafter defined pulse length are defined.

It has been found that the following general parameter result in effective system:

distance from sonar to target 1,000 to 5,000 feet
target length 10 to 200 feet
pulse length—generally the same order of magnitude as the target length
($\theta$—1° to 30°)

target speed—10 to 50 knots
reflector size—4" to 18" diameter shperes
reflector material—Aluminum or steel The reflective targets are clustered together in such a manner that reflection from them arrive at the receiver under a time domain equal to about one-half the transmitted pulse length. Under the above stated conditions the target strength of a group of small similar targets can be established as equal to the target strength of a single target through the following relationship:

$$TS(dB) = TS_1(dB) + 10\log N^M(dB)$$

where
- TS—is the target strength of the large target
- $TS_1$—is the target strength of the small individual target (function of size)
- N—are the number of individual targets ensonified or reflecting within the time domain determined as equal to one-half the length of time of the transmitted pulse
- M—is the power the existing quantity N is raised to (function of material)

It should be noted that the exponent N is the phase relationship existing between the sum of all the reflectors and is dependent upon the relative aspect angle.

In FIG. 4 is shown a diagram illustrating an analysis of the method by which the reflected signal is generated. A simplified example of three reflectors A, B and C is used to demonstrate the principle. In FIG. 4 is shown a transmitted pulse having a length of five units. Also shown are reflectors A and B having two units spacing and reflectors B and C having one unit spacing. The diagram illustrates a series of time increments $t_0$, $t_1$, -$t_9$ to illustrate the movement of the transmitted signal over reflectors A, B and C and the corresponding generation of reflected signals. The reflected signals are shown as crosshatched and the transmitted signals as open. Legends are added to denote the transmitted signal and the reflected signals from the targets A, B and C as a function of time. For example, at time $t_0$ there is no reflected signal since the transmitted signal has not yet reached target A. At time $t_1$, target A has a reflected signal of one unit. At time $t_2$, target A has a reflected signal of two units. At time $t_3$, target A has a reflected signal of three units and target B has a reflected signal of one unit. At time $t_4$, target A has a reflected signal of four units, target B a reflected signal of two units and target C a reflected signal of one unit. This process continues as shown until time $t_8$ when the transmitted signal passes reflector C (having already passed A and B) and the reflection process is terminated. At time $t_9$ the three reflected signals are shown moving to the left to be received by the sonar receiver. At the bottom of the drawing is illustrated the combined reflected signal from targets A, B and C which provides the desired simulated target shape.

The combined reflected signal of the FIG. 1 embodiment is shown in FIG. 1B. In this example the transmitted signal has a length of 14 units. Twelve reflectors are used in group I having one unit spacings and twelve reflectors are used in group II having one unit spacing. Ten units of space 21 are provided between groups I and II. By using the analysis previously described in the three reflector embodiment of FIG. 4 a resultant reflected signal may be constructed as shown in FIGS. 1A and 1B.

In FIGS. 5A, 5B and 5C are shown reflectors respectively having spherical, ellipsoidal and diamond configurations that have been found to be useful in the present invention.

What is claimed is:
1. A multipoint reflective target comprising:
   (a) a plurality of reflectors;
   (b) said plurality of reflectors spaced apart and interconnected by a flexible member;
   (c) the number and spacing of said reflectors when elongated are selected to provide a predetermined reflected signal that resembles a predetermined actual target when sonified; whereby
   (d) said sonification is achieved by a sonar having a pulse length that is about equal to the length of the elongated plurality of reflectors.
2. The device of claim 1 wherein:
   (a) said plurality of reflector comprises two groups of reflectors wherein said groups are spaced apart.
3. The device of claim 1 wherein:
   (a) said reflectors comprise spheres.
4. The device of claim 1 wherein:
   (a) said reflectors comprise ellipsoids.
5. The device of claim 1 wherein:
   (a) said reflectors have a diamond configuration.
6. The device of claim 3 wherein:
   (a) said spheres have a diameter of about 6 inches and have centers that are spaced apart about 12 inches.

* * * * *